United States Patent [19]

Umetsu et al.

[11] Patent Number: 5,090,113

[45] Date of Patent: Feb. 25, 1992

[54] APPARATUS FOR SUPPLYING ARTICLES

[75] Inventors: Sachio Umetsu, Kawasaki; Toshio Tsuda; Yusaku Azuma, both of Yokohama; Toshihiko Miura, Kawasaki; Katsumi Ishihara, Yokohama; Teiji Ohsaka, Ushiku, all of Japan

[73] Assignee: Canon Kabushiki Kaisha, Tokyo, Japan

[21] Appl. No.: 503,745

[22] Filed: Apr. 3, 1990

[30] Foreign Application Priority Data

| Apr. 5, 1989 | [JP] | Japan | 1-039597[U] |
| Apr. 5, 1989 | [JP] | Japan | 1-084881 |
| Apr. 5, 1989 | [JP] | Japan | 1-084882 |
| Apr. 5, 1989 | [JP] | Japan | 1-084883 |
| Apr. 5, 1989 | [JP] | Japan | 1-084884 |
| Apr. 5, 1989 | [JP] | Japan | 1-084885 |

[51] Int. Cl.$^5$ .......................... B65H 16/00; B25J 9/00
[52] U.S. Cl. ....................... 29/714; 29/709; 29/779; 29/782
[58] Field of Search ............... 129/306, 707, 714, 709; 29/779, 771, 782; 414/411, 416

[56] References Cited

U.S. PATENT DOCUMENTS

| 3,581,371 | 6/1971 | Bushey | 29/707 |
| 3,961,912 | 6/1976 | Noel | 29/714 |
| 4,514,958 | 5/1985 | Hoorn | 414/411 X |
| 4,615,093 | 10/1986 | Tews et al. | 29/709 X |
| 4,630,364 | 12/1986 | Fyfe et al. | 29/779 |
| 4,738,015 | 4/1988 | Kato | 29/709 X |
| 4,844,680 | 7/1989 | Kawata et al. | 414/331 |
| 4,907,343 | 3/1990 | Dolan et al. | 29/707 |
| 4,932,828 | 6/1990 | Katae et al. | 414/286 |

FOREIGN PATENT DOCUMENTS

51-128775 11/1976 Japan .
60-48855 3/1985 Japan .

*Primary Examiner*—Timothy V. Eley
*Assistant Examiner*—C. Richard Martin
*Attorney, Agent, or Firm*—Fitzpatrick, Cella, Harper & Scinto

[57] ABSTRACT

There is disclosed an apparatus for feeding articles, containing a tape transporting apparatus, including a transporting member having plural container portions in succession, a cover tape for covering the apertures of the container portions of the transporting member, a first reel on which ends of the transporting member and the cover tape are fixed, for simultaneously winding the transporting member and the cover tape, a second reel on which the other end of the transporting member is fixed, for winding the transporting member only, a third reel on which the other end of the cover tape is fixed, for winding the cover tape only, a drive assembly for rotating the first, second and third reels, intermittent drive unit for intermittently driving the transporting member by engaging with successive perforations formed on the transporting member, a control unit for driving the drive assembly and intermittent drive unit, an aperture for loading or removing the articles into or from the container portions of the transporting member, a first detector provided in the vicinity of the aperture, for detecting the presence or absence of an article in a container portion, and a guide member for defining the position to an article assembling apparatus or an article manufacturing apparatus, wherein each of these apparatus is provided with a robot hand and a main control unit to be connected to the control unit mentioned above.

3 Claims, 10 Drawing Sheets

BIT-SIGNAL OF OPERATION MODE

| OPERATION MODE OF TAPE CASSETTE | BIT SIGNAL |
|---|---|
| 1. TAPE CASSETTE LOADING COMPLETION MODE | A |
| 2. INITIAL STATE OPERATION MODE | B |
| 3. ARTICLE AT PICK-UP POSITION MODE | C |
| 4. PICK-UP FINISHED MODE | D |
| 5. LAST ARTICLE DETECTING MODE | E |
| 6. ARTICLE IN TAPE CASSETTE FINISHED MODE | F |
| 7. JUMP MODE | G |

| OPERATION STATE SIGNAL | BIT SIGNAL A, B ---- K |
|---|---|
| OUTPUT SIGNAL OF CONVERTER (a1) |  |
| OUTPUT SIGNAL OF DIVIDER (a2) |  |
| OUTPUT SIGNAL OF SIGNAL OPERATION NUMBER (a3) |  |

FIG. 11 PRIOR ART

APPARATUS FOR SUPPLYING ARTICLES

BACKGROUND OF THE INVENTION

1. Field of the Invention

The present invention relates to a method for supplying an automatic apparatus for assembling or working such as a robot with articles therefor, and more particularly such supply method in which said articles are stored or supported in a tape-shaped supply member and said supply member is supplied in the form of a reeled cassette.

2. Related Background Art

For the recent progress of factory automation, there have been proposed various automatic assembling apparatus, but the major technical target to be solved in such apparatus is the rapid, secure and inexpensive supply of articles (component parts) to be assembled.

The most commonly employed method of component supply to the automatic assembling apparatus is the so-called pallet method, of preparing pallets in consideration of the shape, weight and material of the parts to be supplied, arranging said parts in advance on said pallet, then transporting said pallet to a predetermined position, and taking out said parts in succession from the pallet by means of the automatic assembling apparatus, for assembly therein. Such pallet method is applicable to and effective to a certain extent with large component parts, but small parts such as screws are too small for handling in such pallet method and are too many in number for such pallet method.

Even if the pallet method is to be applied to small parts such as screws, there will have to be handled a tedious job of properly aligning such small parts on the pallet.

In consideration of such inconvenience, there is often employed, for such small parts, a vibration part feeder method in which the small parts are loosely contained in a container, and are arranged in one direction and aligned for enabling one-by-one supply thereof, by the vibration of the container.

However, said pallet method or the vibration part feeder method is associated, in case of supplying plural kinds of parts, with a drawback of requiring pallets or feeders matching the shapes of such plural kinds of parts.

A cassette method for avoiding the above-mentioned drawbacks has been proposed by Japanese Laid-Open Patent Application Sho 60-48855, in which parts are contained in continuous manner in a cassette, as shown in a perspective view in FIG. 4 thereof.

Figure 11:
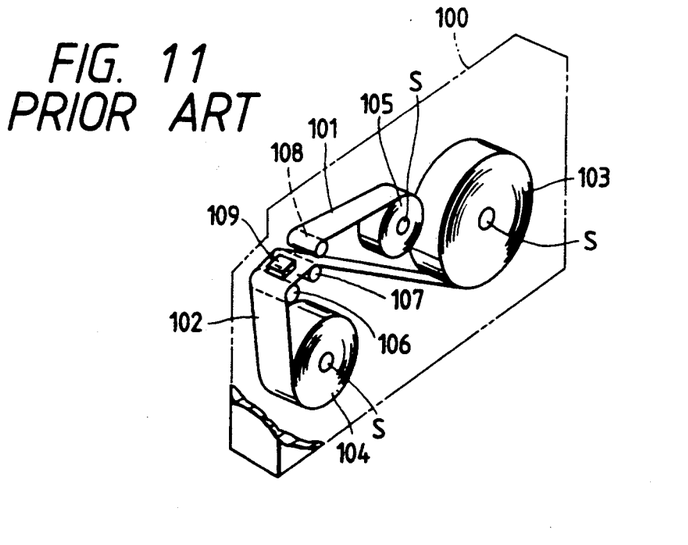
FIG. 11 is a schematic view of a conventional tape cassette.

More specifically, as shown in FIG. 11, a cassette case 100 indicated by a chain line is provided therein with three studs S rotatably supporting reels 103, 105, 104, wherein belts 101, 102 which can be adhered and separated plural times are wound on said reel 103.

In said cassette 100, articles 109 to be supplied are in advance sandwiched between the belts 101, 102, and wound on the reel 103.

By rotating the winding reels 104, 105, the belts 101, 102 are taken up along rollers 106, 107, 108 to expose the article 109 sandwiched therebetween, and said article 109 can be taken out for example by a robot hand and used for example for the assembling work.

Also for supplying a robot for assembling or working an article with said articles, there have been proposed various methods.

Japanese Patent Publication Sho 63-59813 discloses a structure consisting of a robot running on an endless rail, a peripheral apparatus for working or assembling in cooperation with said robot, and an apparatus for centralized control.

Also Japanese Laid Open Patent Application Sho 51-128775 discloses an automatic assembling apparatus including a reciprocating table having a predetermined moving trajectory, and a part supplying apparatus, a working/assembling machine etc. positioned in concentrated manner close to the trajectory of said reciprocating table, wherein a manipulator provided on said reciprocating table takes a part from said part supplying apparatus and feeds it to the working/assembling machine to effect the required assembling work.

SUMMARY OF THE INVENTION

A first object of the present invention relates to an article transport/feeding apparatus in which articles are contained in article containing portions formed in an article transporting member such as a tape which is contained in a cassette, and is to provide an article transporting apparatus employing a tape, capable of exact positioning of the articles on the transporting member such as tape, thereby enabling the handling of said articles for example by a robot, also not requiring the replacement of said tape and not generating slack in said tape at the winding thereof, thereby enabling secure transportation of the articles.

It is also an object to provide an article transporting apparatus employing a tape, enabling the detection of presence or absence of the article immediately before the operation of the robot hand, thereby avoiding wasted operation of the robot hand, such as pickup errors.

A second object of the present invention relates to a system for working or assembling the article employing the article transporting apparatus of the present invention for feeding said articles to a robot.

In an assembling/working system in which plural tape cassettes incorporating articles are arranged along the running path of a robot and the assembling or working operation is conducted by receiving the articles in succession from said tape cassettes by the robot, there occurs a pickup failure by the robot hand in the assembling or working operation by the robot by picking up of the article supported by the transporting member in the tape cassette.

Such pickup failure is caused for example by the absence of the article in the transporting member of the tape cassette.

In the system with plural tape cassettes arranged along the running path of the robot, for effecting the assembly by picking up the articles in succession from said tape cassettes, 50 articles are loaded in each tape cassette, for example in order to assemble 50 products in a continuous operation. In such case, the eventual absence of an article in any of the cassettes gives rise to an error in the production schedule, or a defect in the assembled product.

The above-mentioned object can be achieved, according to the present invention, by a method of storing articles in continuous manner in a transporting member and supplying said articles in succession to an article feeding position, utilizing a working station for effecting the assembling or working operation by a first robot by feeding said articles thereto stored in said transporting member, and an article loading station provided with a second robot for storing said articles in said transporting member, wherein the information on the number of articles in said working station is transmitted to said article loading station, thereby correcting the loading of articles.

Also, the present invention proposes an effective method for supplying the robot with the articles carried by tapes, by arranging, along the running path of the robot, plural tape cassettes each containing a carrier tape carrying said articles.

The present invention also proposes a method, in the cable communication between the robot and the supply apparatus or peripheral apparatus, for avoiding the problems related to cable wiring particularly cable wiring method, breakage or defects in electric wiring and complications in electric wiring.

Furthermore, the present invention proposes, a method of supplying different articles by means of plural tape cassettes, according to the procedure of assembling or working by robot, in which, in the access of the robot to each of plural tape cassettes, the robot recognizes the function status of each tape cassette by a signal therefrom and functions accordingly.

In a system as disclosed in the aforementioned Japanese Laid-Open Patent Application Sho 60-48855, in which the aforementioned assembling/working apparatus is combined with a tape cassette containing a tape carrying the articles for successive removal of said articles by rewinding of said tape, there may eventually result the failure of loading of the article in the storage position on the tape, in the course of loading process, for example by the feeding of the tape without a pickup operation by the loading robot.

The assembling or working of the article is not conducted if the article is not contained in the storage position of the tape.

Also, in a system for effecting an assembling operation by picking up different articles from plural tape cassettes positioned along the running path of the robot, the assembling of a complete product cannot be achieved if the article is absent in the storage position of the tape.

DETAILED DESCRIPTION OF THE PREFERRED EMBODIMENTS

Now the present invention will be clarified in detail by preferred embodiments thereof shown in the attached drawings.

1) Carrier tape

Figure 1:
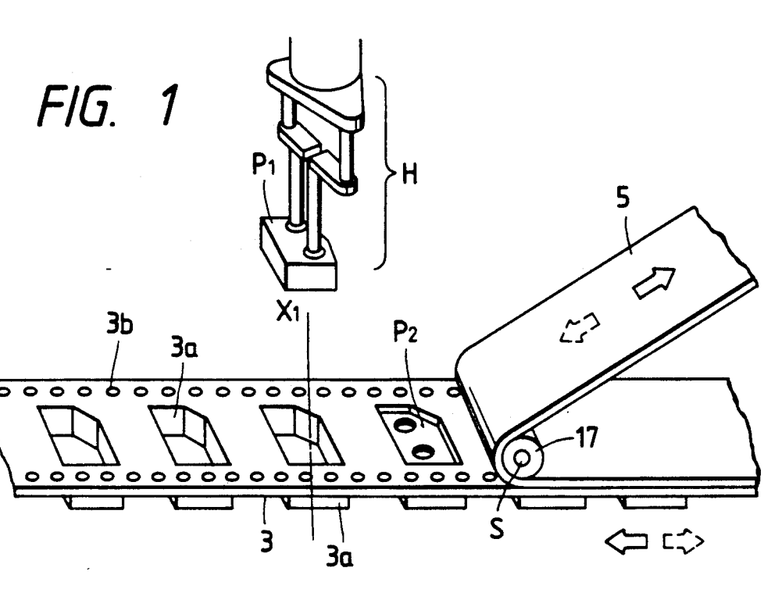
FIG. 1 is a schematic view showing the basic principle of storage and removal of a component part P into and from a tape.

FIG. 1 shows the basic principle of storage and removal of a component part into and from a tape constituting the transporting member. A carrier tape 3 is provided, in succession and with a constant pitch, with recesses (storage portions) 3a of which the internal dimensions (depth, width and height) are slightly larger than the external dimensions of the component part P. Also the carrier tape 3 is provided, along lateral edges thereof, with perforations 3b in successive manner, which engage with a sprocket 12 for transmitting the driving force to the carrier tape 3. A cover tape 5 is provided for covering, as illustrated, the component part P set in the recess 3a, thereby maintaining the component part P in the set position in the recess 3a and rendering said part P removable.

When the carrier tape 3 and the cover tape 5 are moved in a direction indicated by a broken-lined arrow, the component part P is moved as indicated by a broken-lined arrow, then set in the recess 3a of the carrier tape 3, and is covered on the upper face by the cover tape 5. On the other hand, when the carrier tape 3 is moved in a direction indicated by a solid-lined arrow and the cover tape 5 is also moved as indicated by a solid-lined arrow with deflection by a guide roller 17 rotatably supported on a stud S, the component part P is exposed in the upper part thereof and is thus rendered removable. After the component parts P are stored as explained above, the carrier tape is wound on a reel for effecting continuous storage and supply operations.

2) Structure of apparatus

Figure 2:
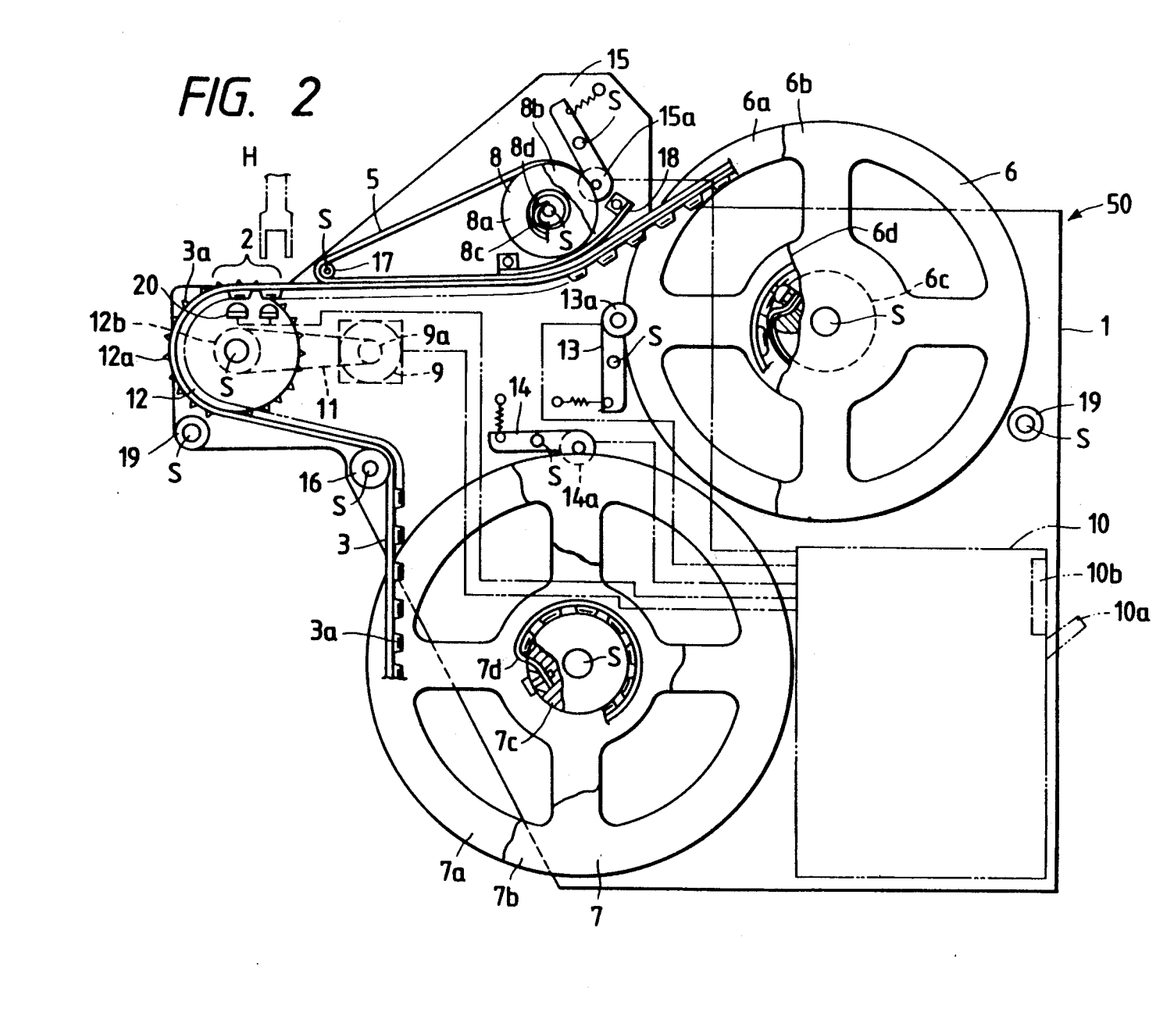
FIG. 2 is a lateral view showing the schematic structure of an embodiment of the tape-carried article transporting apparatus 50.

FIG. 2 is a schematic lateral view of an embodiment of the tape-carried article transporting apparatus 50, in which the above-mentioned carrier tape 3 and cover tape 5 are wound in reels.

A base plate 1 formed from a plate material is integrally provided with an unrepresented reinforcing member, thereby having a strength sufficient for supporting all the following components on one side. Studs S are perpendicularly provided on an unrepresented frame integral with the base plate 1, for rotatably supporting reels and wheels.

The carrier tape 3, with the parts P carried in the recesses 3a as explained above and with the cover tape 5 covering the apertures of said recesses 3a, is wound on a part mounting reel 6. A part mounting reel 6, a cover tape reel 8 for winding and feeding of the cover tape 5, and a tape reel 7 for winding and feeding of the carrier tape 3 are rendered rotatable about the studs S. The ends of said tapes are fixed by fixing parts 6d, 7d, 8d of the central cores 6c, 7c, 8c of said reels, and said tapes are respectively wound on the peripheries of said cores 6c, 7c, 8c. These reels are respectively provided with rotating means, which transmit the rotating force by contact with the external peripheries of said reels.

Thus the part mounting reel 6, tape reel 7 and cover tape reel 8 are respectively provided with rotating means for transmitting the driving force to said reels.

Figure 3:
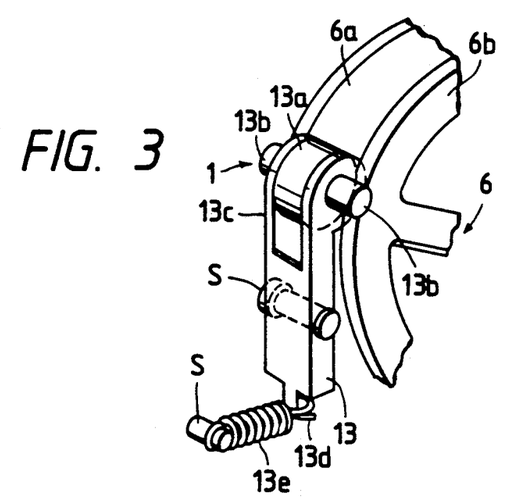
FIG. 3 is an external view of a driving assembly 13 of a part mounting reel 6 in rotary means.

FIG. 3 is an external view of a driving assembly 13 for the part mounting reel 6. The following description will be concentrated on said assembly 13, but it is to be understood that similar driving assemblies 14, 15 are respectively provided for the tape reel 7 and the cover tape reel 8.

Referring to FIG. 3, a motor 13a for driving the tape and giving tension thereto is provided, on both ends of the shaft thereof, with rubber rollers 13b of urethane rubber. In order to maintain said rubber rollers 13b with the external peripheries of hubs 6a, 6b of the reel 6 with biasing force, said motor, 13a is mounted on an end of an arm member 13c rotatably supported about a stud S perpendicularly fixed on the base plate 1.

A tension spring 13e is provided between the other end 13e of said arm member 13c and another stud S, thereby giving a clockwise biasing force to said arm member 13c. Thus the peripheries of the rubber rollers 13b are maintained, with a biasing force, in contact with the peripheries of the hubs 6a, 6b of the reel 6, thereby frictionally driving the same.

Again referring to FIG. 2, the motors 13a, 14a, 15a are driven as will be explained later, by wirings to a control unit 10 (shown in FIG. 6A), as indicated by double-dotted chain lines.

Said control unit 10 is incorporated in the tape-carried article transporting device 50, and is automatically powered when said device is mounted in the assembling apparatus M or the part manufacturing apparatus N to be explained later.

The mounting of the tape-carried article transporting device 50 into the assembling apparatus M or the part manufacturing apparatus N automatically actuates a power switch SW1, and it is also possible to switch the operating mode by a selector switch 10a.

A stepping motor 9, indicated by broken lines, is controlled by the control unit 10 through wirings indicated by double-dotted chain lines. Said stepping motor 9 rotates a sprocket gears 12b of the sprocket 12 rotatably supported by a stud S, through a belt 11 indicated by broken lines.

Said sprocket 12 is provided, on the periphery thereof, with pins 12a engaging with the perforations 3b of the carrier tape 3, for advancing said carrier tape 3. Two sprocket gears 12b are integrally formed with the sprocket 12 for engaging two rows of perforations 3b of the carrier tape 3.

Figure 6A:
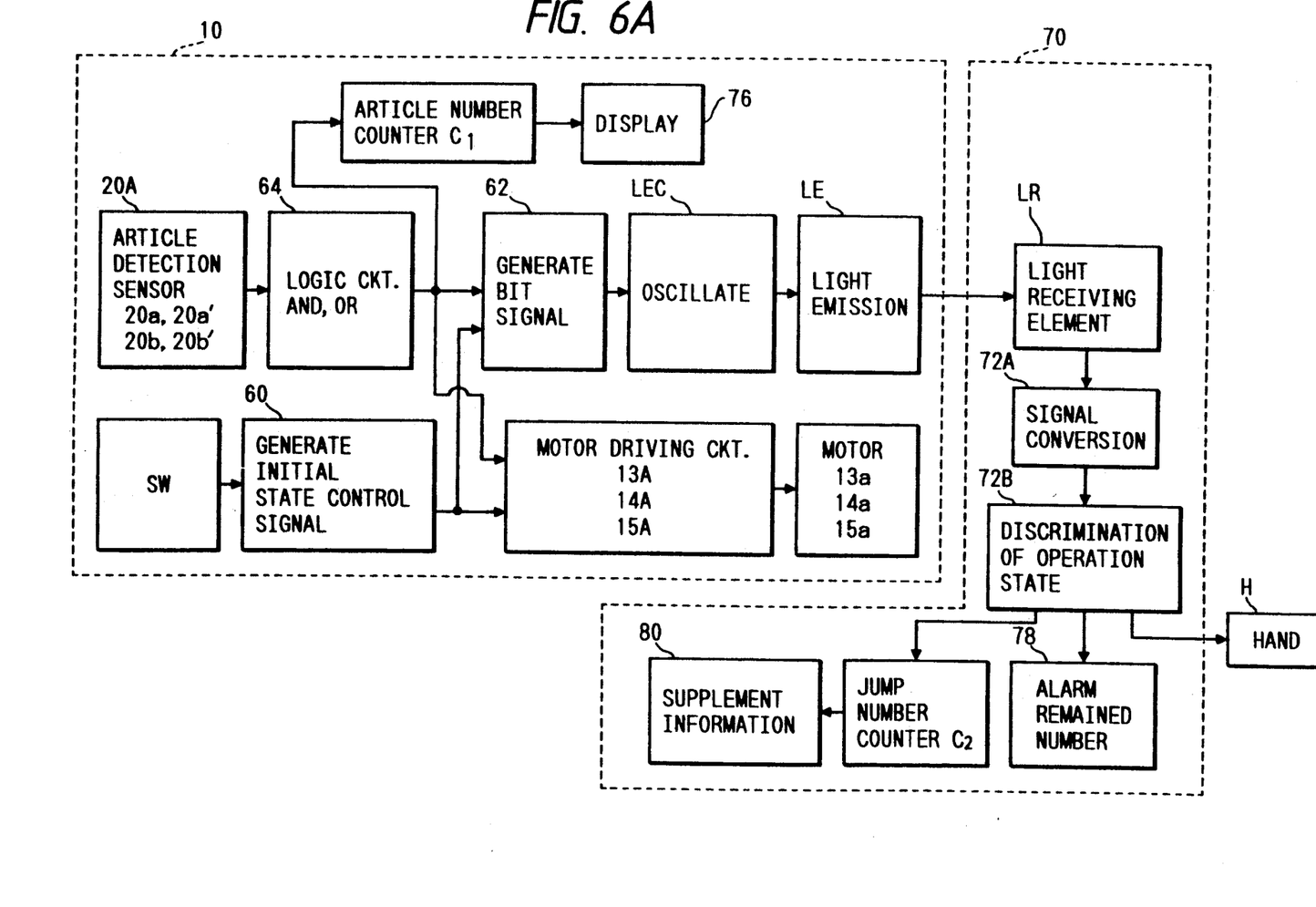
FIG. 6A is a block diagram of a tape cassette controller and a robot controller.
Figure 6B:
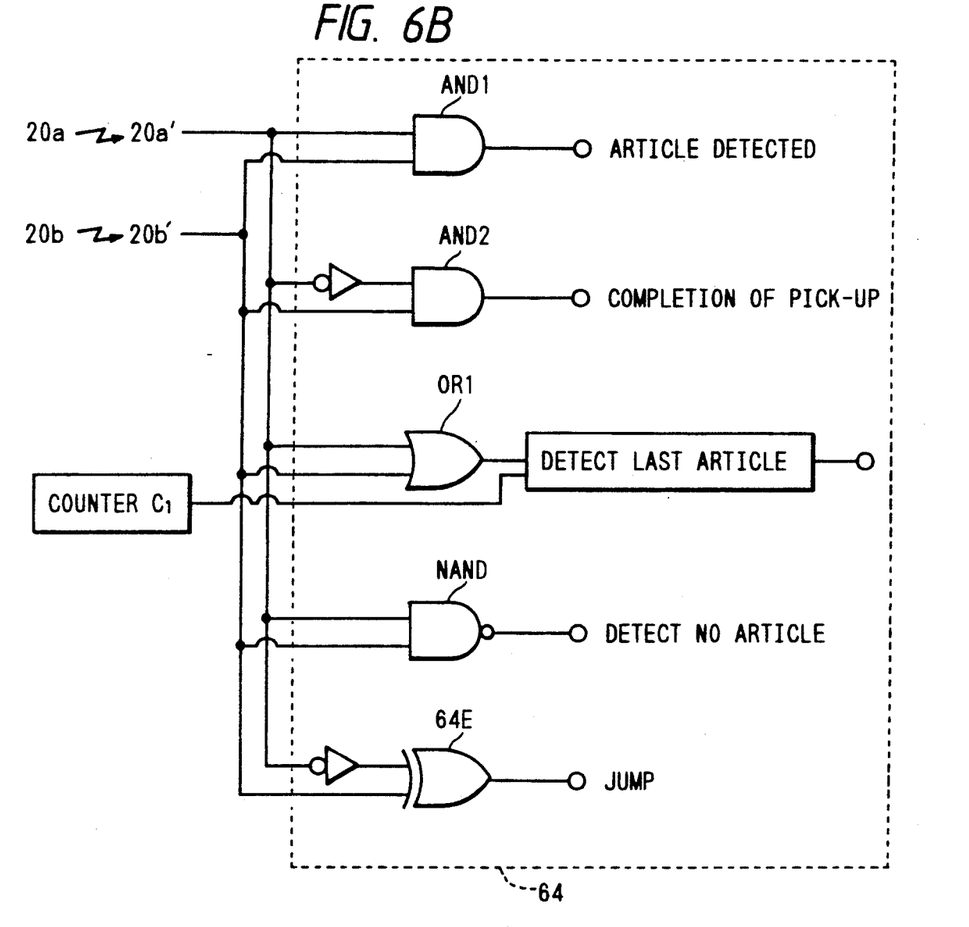
FIG. 6B is a detailed block diagram of a logic circuit 64.
Figure 8:
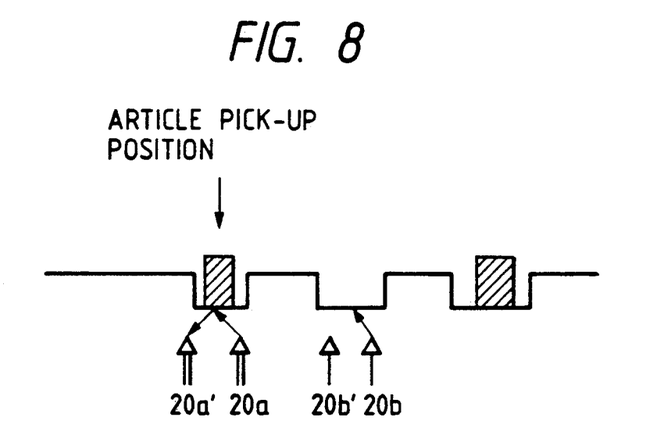
FIG. 8 is a schematic view of a sensor 20.

Two part sensors 20 are positioned, between two sprockets 12 and in the vicinity of an aperture 2 (through which unit H can access the recesses in the carrier type) with a pitch the same as that of the recesses 3a and fixed on the base plate 1, for counting and detecting the presence of the component parts. Said sensors 20 are composed of light-emitting elements and photosensors 20a, 20', 20b, 20b' (photosensors 20a', 20b' being not themselves being shown through these objects are represented in FIGS. 6B and 8), for projecting light to the stored article through the translucent part of the carrier tape 3 and receiving the reflected light.

A guide roller 16, rotatably supported by a stud S on the base plate 1, serves to deflect the carrier tape 3 from the vertical direction to a direction toward the sprockets 12, as shown in FIG. 2.

Another guide roller 17, similarly supported, serves to deflect the cover tape 5 from a direction toward the sprockets 12 to a direction toward the part mounting reel 6.

A curved guide rail 18 provided on the base plate 1 serves to guide the cover tape along the curved face thereof.

Paired cam followers 19 rotatably supported by studs S at the left and right ends of the base plate 1 serve as guide members in relative positioning at the mounting of the article transporting device 50 in the assembling apparatus M or the part manufacturing apparatus N.

Figure 4A:
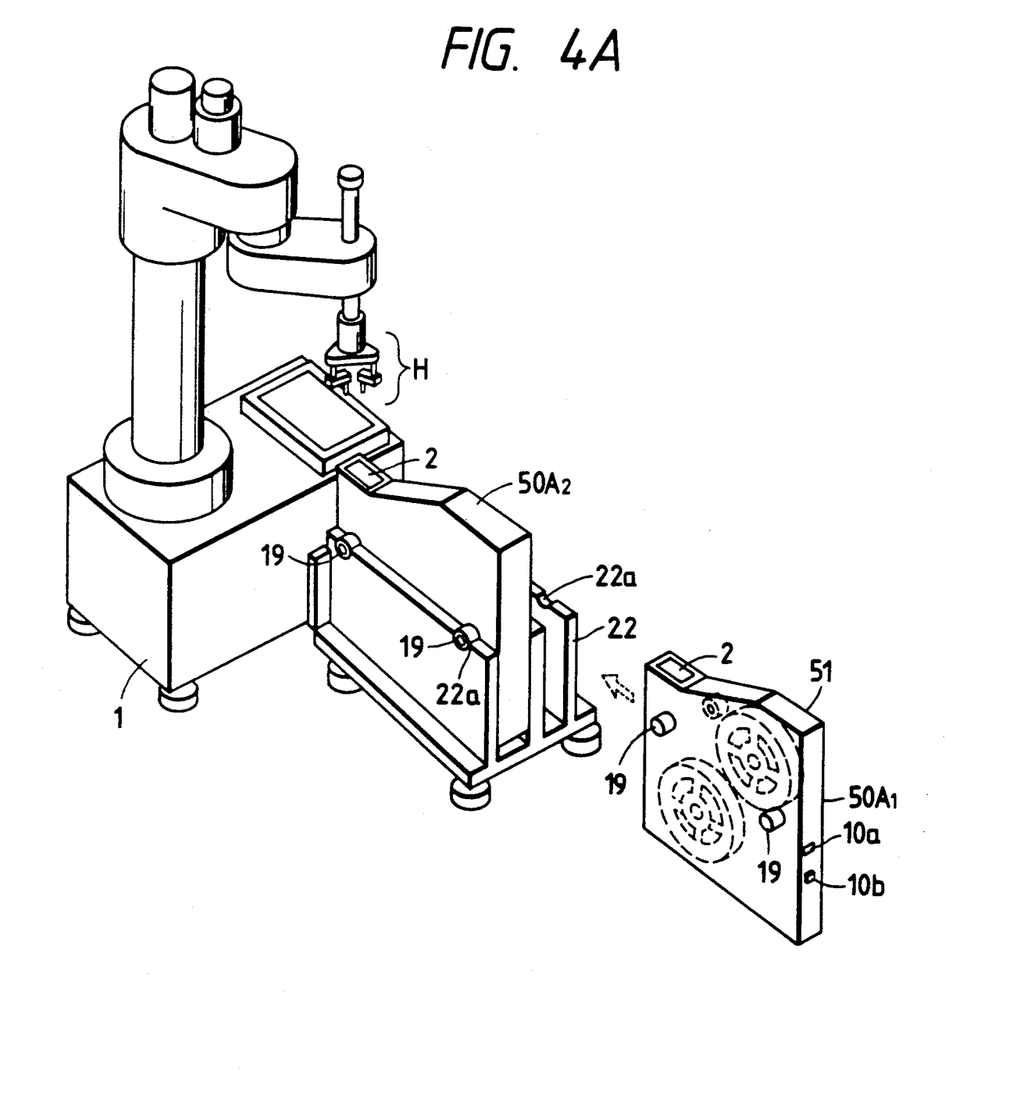
FIG. 4A is a perspective view showing the mode of setting the tape-carried article transporting device 50 into an assembling apparatus M equipped with a robot hand H.
Figure 4B:
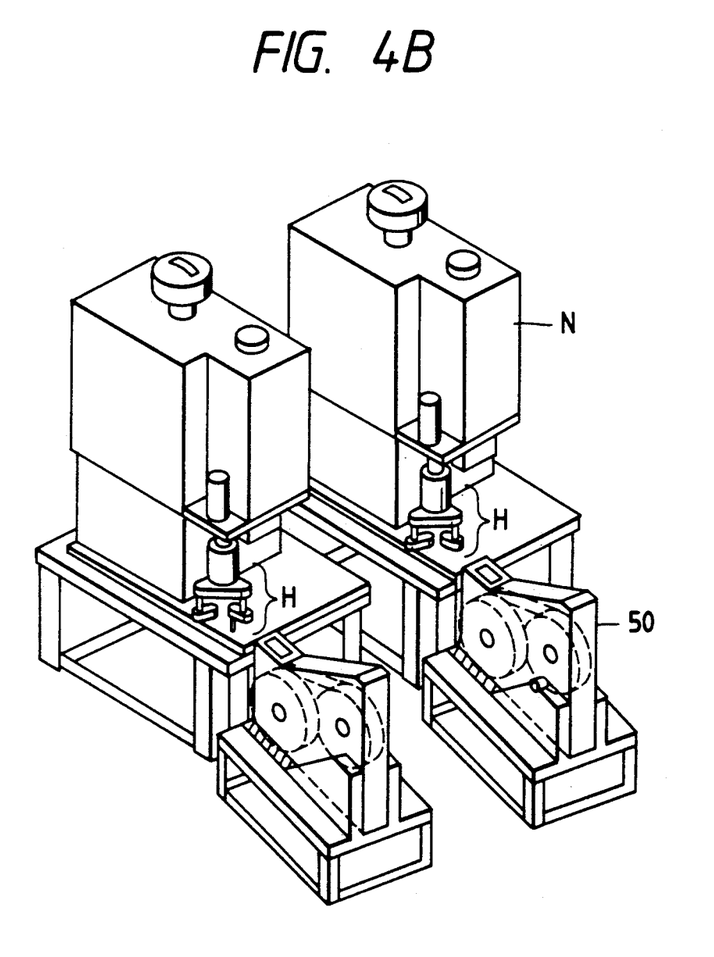
FIG. 4B is a perspective view showing the mode of setting the tape-carried article transporting device 50 into a part manufacturing apparatus N equipped with a robot hand H.

FIG. 4 is an external perspective view showing the mode of mounting of the tape-carried article transporting device 50 in the assembling apparatus M or the part manufacturing apparatus N equipped with a robot hand H. After being inserted into a mounting unit 22 integral with the assembling apparatus M or the part manufacturing apparatus N, the device is set in a predetermined position by the engagement of the cam followers 19, serving as the relative positioning guide members, with engaging grooves 22a of said mounting unit 22.

Figure 5:
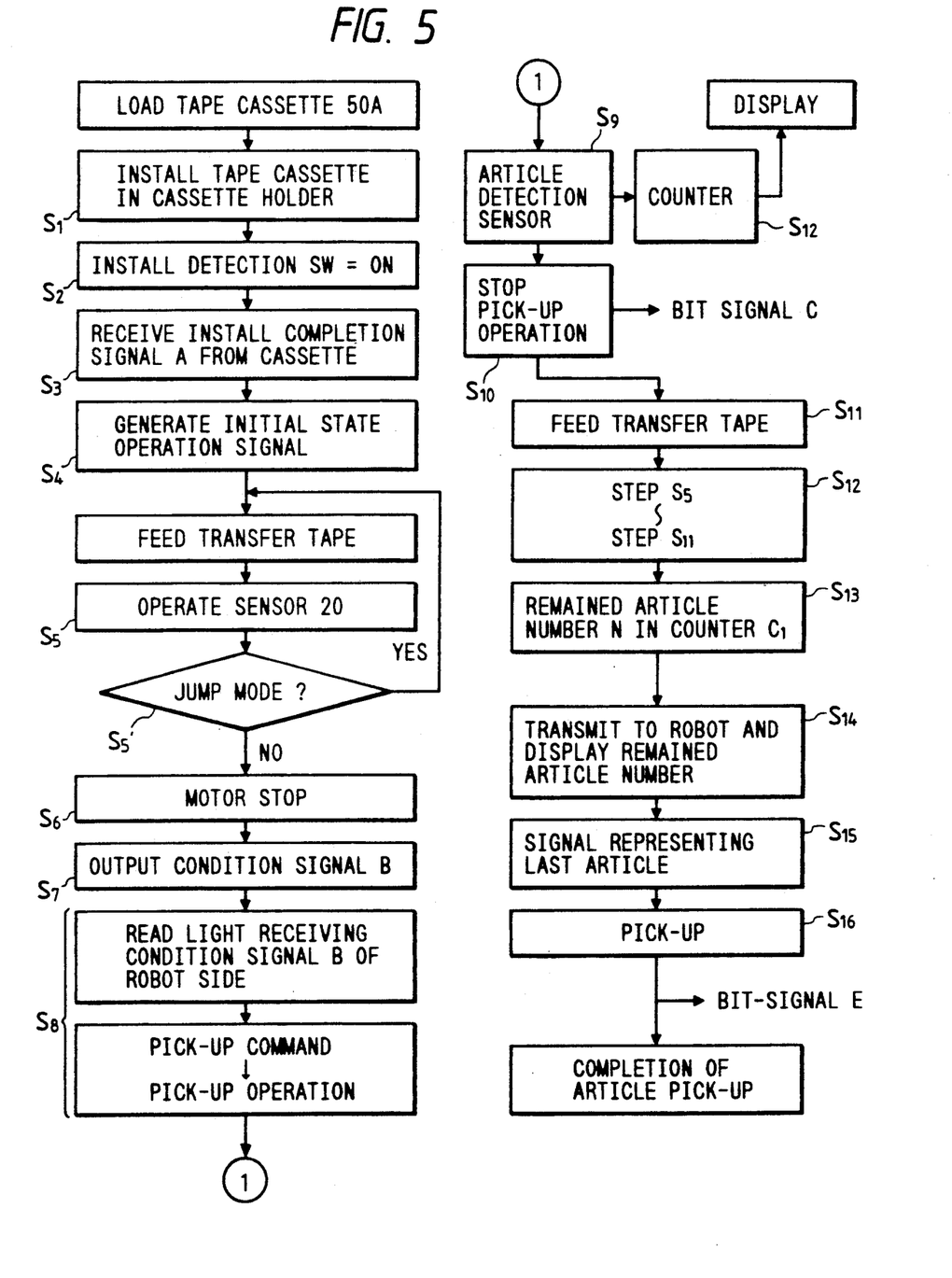
FIG. 5 is a flow chart showing the function of an embodiment of the present invention.

The robot hand H provided on said apparatus M or N is so controlled, as will be explained in relation to the flow chart, as to feed the part P manufactured by the apparatus N to the empty recess 3a of the carrier tape 3, or the part P stored in the recess 3a of the carrier tape 3 to the assembling apparatus M.

3) Flow chart

In the following there will be explained the function of the present embodiment, with reference to a flow chart shown in FIG. 5, and block diagrams shown in FIGS. 6A and 6B.

1. Mounting of tape cassette 50 to cassette holder

A tape cassette 50A1 is subjected, in an article loading station shown in FIG. 4B, to the loading of articles molded in a molding machine in the recesses 3a, 3a, . . . of the carrier tape 3, and, after the loading of a predetermined number of articles $P_1, P_2, \ldots$, is mounted on a cassette holder 22 shown in FIG. 4A (step S1).

The number of articles stored in the tape cassette 50A1, variable depending on the product to be assembled or worked or the number of articles required in each product, is memorized in a counter C1 of the controller 10 of the tape cassette. When the tape cassettes 50A1, 50A2, . . . are mounted on the cassette holders manually or automatically, there is conducted communication with the controller of the robot. When a cassette is mounted on the cassette holder, a mounting detection switch SW1 positioned between said tape cassette and said cassette holder is turned on (step S2). In response to the signal from said switch SW1, a signal A indicating the completion of mounting is supplied to a light-emitting circuit LEC, which converts said signal A into a corresponding pulse signal causing the light-emitting element LE to release a mounting completion signal A (step S3).

Upon mounting of the tape cassette 50A1 on the cassette holder, simultaneously with the closing of the switch SW1 provided between the tape cassette 50A1 and the cassette holder, an initial state operation signal B of the tape cassette is supplied to motor drive circuits 13A, 14A, 15A for the tape feeding motor 13a, tape winding motor 14a and cover tape motor 15a. Upon completion of the loading of the articles into the recesses of the carrier tape in the article loading station, the cover tape is laid on the last article holding aperture of the carrier tape, and the carrier tape 3 and the cover tape 5 are slightly taken up in order to prevent the loss in the articles. For this purpose it is necessary to mount the tape cassette 50A$_1$ in the cassette holder and to fully reverse the carrier tape toward the feeding reel, in order to place the first article storage recess at the article pickup position (X1—X1 in FIG. 1) by the robot hand. Initial state operation signal generating means 60 releases, in response to the signal from said switch SW1, said initial state operation signal B for activating the motor drive circuits 13A, 14A, 15A for predetermined periods, for defining the first recess containing an article at the position for removal (step S4).

The operation signal B from the generating means 60 activates a sensor operation circuit 20A for the sensors 20 constituting the article detecting means. In the present embodiment, said sensors 20 are composed of two sets of light-emitting element and photosensor, of which the light-emitting elements emit light in response to a signal from the operation circuit 20A. If the light is intercepted by the first article stored in the translucent tape, the photosensors do not receive the light and a first logic signal "1" is released from an AND gate (step S5).

When the carrier tape is advanced by the rotation of motors so that the article in the first recess is brought to the removing position where the robot hand H effects the pickup operation, the photosensors of the sensors 20 activated in said step S5 generate a detection signal.

In response to the signals from the photosensors 20a', 20b', the AND gate in the logic circuit 64 releases a logic signal "1", thereby deactivating the motor drive circuits (step S6).

Said detection signal from the sensor 20 is supplied to a bit signal forming circuit 62, for generating a signal C, which is transmitted to the robot through a light-emitting circuit LEC, a light-emitting element LE and a photosensor of the robot (step S7).

A controller 70 of the robot sends the signal received by the photosensor LR to a signal conversion circuit 72A, of which output signal is supplied to an operation state discriminating circuit 72B. Said circuit 72B identifies the received signal as indicating the presence of an article in the removal position, and sends a pickup command to the robot hand H (step S8).

When the recess of the carrier tape 3 is evacuated by the article pickup operation of the robot hand H, the first sensor is turned off while the second sensor is turned on, whereby a second AND gate 64B of the logic circuit 64 releases a signal indicating the absence of article (step S9).

Said signal is supplied to the bit signal forming circuit 62 and the motor drive circuit, and said circuit 62 releases a signal D indicating the end of pickup operation.

Said signal D from the bit signal forming circuit, indicating the absence of the article in the recess at the removal position and prohibiting the pickup operation by the robot hand H, is transmitted to the robot through the light-emitting element LE and the photosensor LR of the robot (step S10).

In response to the signal from the logic circuit 64 in the step S9, the motors are activated to advance the next article to the removal position (step S11).

In the step S9, when the photosensor 20a' releases the signal indicating the absence of article at the end of the pickup operation of the robot hand, the aforementioned counter C1 is subjected to a decrement (step S12).

Said counter C1 of the tape cassette indicates the remaining number of articles by a display unit 76.

Thereafter repeated are the detection of article at the removal position by the sensor 20, pickup of the article, decrement of the counter C1, and advancement of the carrier tape (step S12).

When the number of remaining articles in the carrier tape in the tape cassette reaches a predetermined number, a warning signal is released from output means 78, for giving a warning to the operator for the preparation of exchange of the tape cassette (step S13).

More specifically, when the remaining number of the counter C1 reaches a predetermined value, a remaining number signal N is sent therefrom to the bit signal forming circuit, which causes the robot to display the warning information through the light-emitting element LE and the photosensor LR of the robot (step S14).

After such warning, for example at a remaining number of 50 articles, when the last article reaches the removal position, the first and second sensors 20 are respectively turned on and off, of which signals are supplied to a third logic OR gate 64C. The output signal of said OR gate and a signal indicating N=1 in the counter C1 are supplied to a final article confirming circuit 80, of which output signal is entered to the bit signal forming circuit 62, whereby a bit signal E, indicating the last article on the carrier tape is transmitted, through the light-emitting circuit LE, to the robot controller 70 (step S15).

In response, the robot controller sends a pickup command to the robot hand (step S16).

Upon pickup of the last article by the robot hand, the first and second sensors release logic signal "", which are sent to a fourth logic NAND gate 64b, thus generating a signal indicating the absence of the last article on the carrier tape. Said signal is supplied to the bit signal forming circuit 62, which sends, to the robot, a signal F indicating that the articles on the carrier tape are completely used up.

4) Skipping operation of recess of carrier tape (Loading failure confirming mode)(step S5')

In the loading of the articles P$_1$, P$_2$, . . . into the recesses 3a, 3a, . . . of the carrier tape, there may result a loading failure for some reason. The apparatus of the present embodiment has a skipping function of detecting an empty recess in the consecutive recesses of the carrier tape by detection means, and skipping such empty recess by further advancing the carrier tape in response to a signal from said detection means.

If, as shown in FIG. 8, an article is present at the removal position but the next recess is empty, the photosensor of the first sensor receives the light from the light-emitting element reflected by the article and generates a signal, but the photosensor of the second sensor does not release the signal due to absence of the article. The signals from said first and second photosensors are supplied to a fifth logic EXCLUSIVE OR gate 64E constituting a skipping confirming means.

The output signal of said EXCLUSIVE OR gate 64E is supplied to the motor drive circuit, whereby the empty recess of the carrier tape is not stopped at the removal position, and the carrier tape is further advanced until the next recess reaches the removal position.

5) Transmission of corrective information to molder at loading failure

Figure 9:
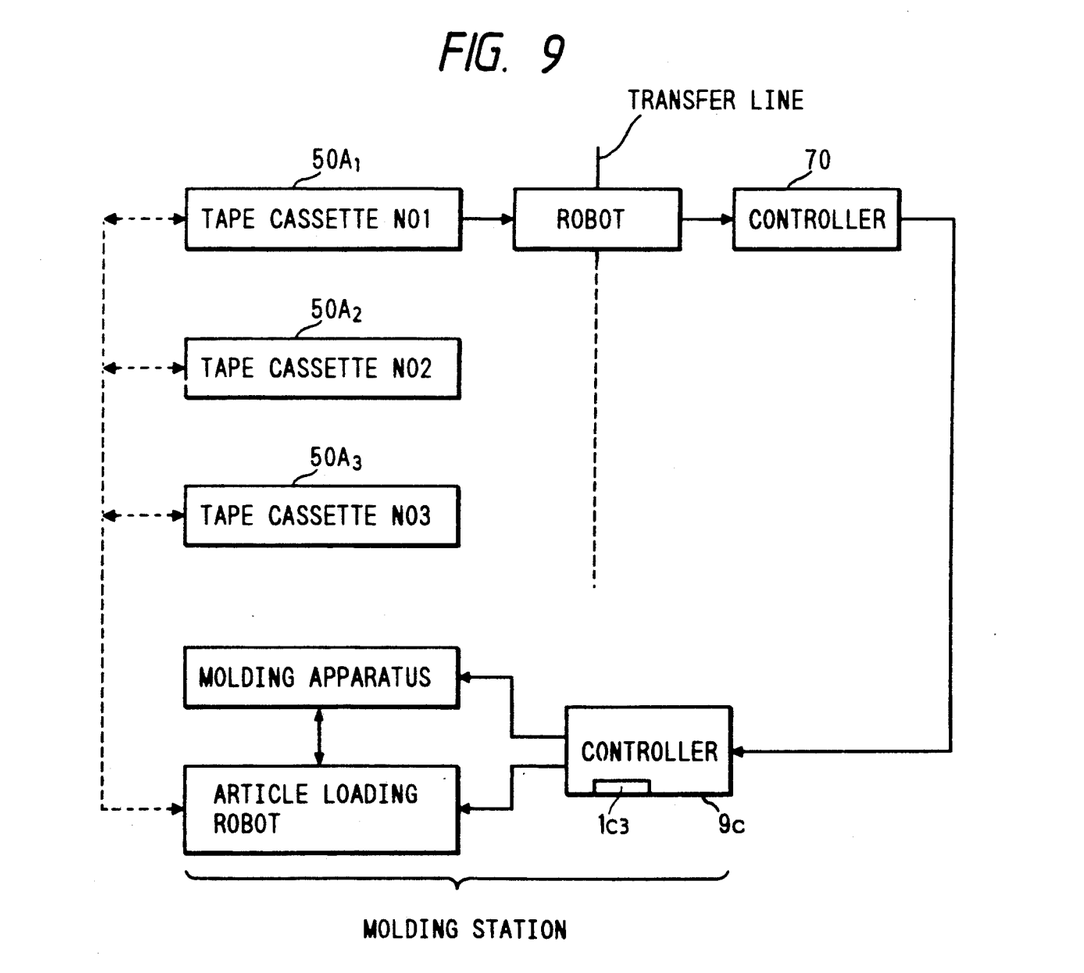
FIG. 9 is a schematic view of the entire system.

The system of the present embodiment is so constructed, as shown in FIG. 9, that plural cassette holders are positioned along the running path of the assembling-/working robot. The tape cassettes loaded in the loading station are mounted on said cassette holders, and, when the robot reaches the position of each tape cassette, the robot makes access to said tape cassette by optical communication between the controller of said cassette and that of the robot. The robot thus executes the assembly or working of the articles by picking up said articles in succession.

In such assembling operation of a product or a unit by successive pick-ups of the articles from the tape cassettes, the number of articles required for said product or unit becomes unmatched if a loading failure happens in a particular cassette, for example No. 2. In consideration of such situation, the present embodiment is provided with a function, in case the above-explained skipping operation is conducted at least for a predetermined number, of sending a signal from the robot controller to the controller of the molding station, in order to effect additional loading of articles in the carrier tape of the corresponding cassette.

More specifically, the signal from said skipping confirming means 64E is supplied to the bit signal forming circuit, which sends a skipping bit signal G to a counter C2 of the robot controller. Upon receiving said signal G a predetermined number of times, the counter C2 causes supplement information generating means 80 to send supplement information to the molding station, which, in the loading of articles into the cassette No. 2, effects supplemental loading, corresponding to the preceding loading failures, on the carrier tape of the cassette No. 2.

More specifically, said supplement information is sent to a controller 90 of the loading station shown in FIG. 4B.

Said controller 90 of the loading station is provided with a counter C3 for counting the number of operations of the loading robot of receiving the article and storing said article into the recess of the carrier tape. Upon completion of loading for example of 100 articles in response to a command for loading 100 articles in the tape cassette No. 1, the counter C3 releases a count out signal to prohibit the loading operation of the loading robot.

The counter C3 of the controller 90 of the molding station functions in the following manner:

i) Ordinary mode

The counter effects addition or subtraction by counting the number of loading operations of the loading robot of the molding station. In the case of substraction, when the number of loading operations reaches 100, the counter C3 releases a count out signal to terminate the loading operation. In response an unrepresented display unit displays the completion of loading of the tape cassette No. 1.

ii) Correction mode

For example if the count of the aforementioned skipping counter C2 is 10, the robot controller 70 sends, to the controller 90 of the molding station, information for loading 10 additional articles into the recesses of the carrier tape of the tape cassette No. 1. In response the counter C3 of the controller 90 is set at an initial count $100+10=110$.

The counter C3 effects subtractions corresponding to the number of loadings of the loading robot, and releases a count out signal to terminate the loading operation when the number of loadings reaches 110.

In such correction mode, if the counter C3 is set for example at 110 in response to the information from the supplement information generating means 80, the display unit may display said number "110" to inform the operator of the supplemental loading of 10 articles.

6) Optical communication

Figure 7:
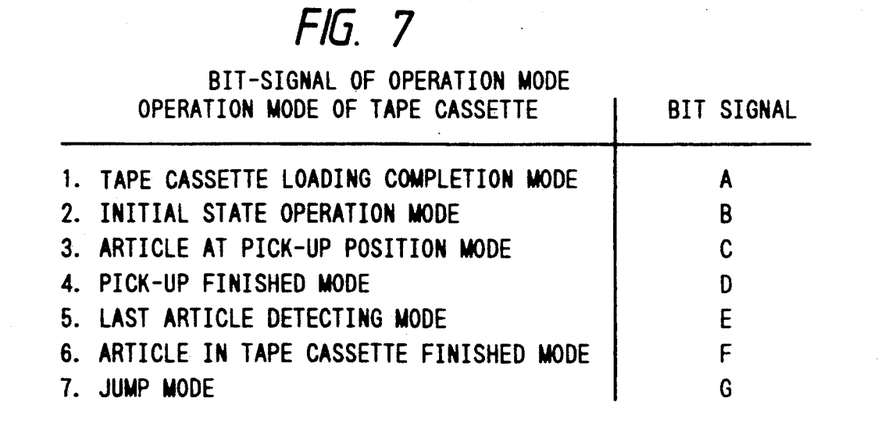
FIG. 7 is a chart showing bit signals representing the work status.

The robot of the present embodiment recognizes the operation state of each tape cassette by the operation state discriminating means 72B, from the bit signal A–G shown in FIG. 7, by receiving the light signal from each accessed one of the cassettes $50A_1$, $50A_2$, . . . and accordingly controls the functions of the robot hand H and the robot itself.

Figure 10A:
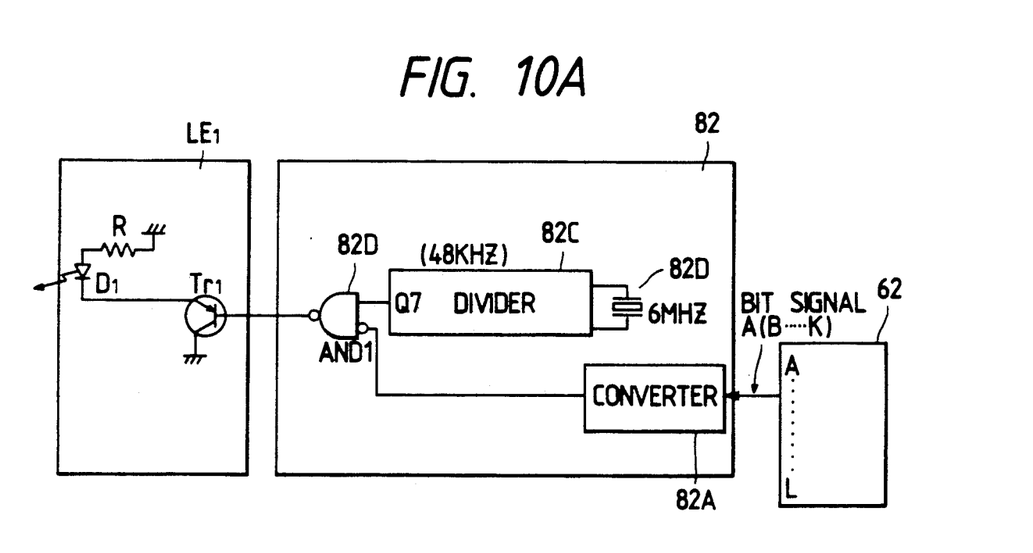
FIGS. 10A, 10B and 10C are views for explaining the signal conversion.
Figure 10B:
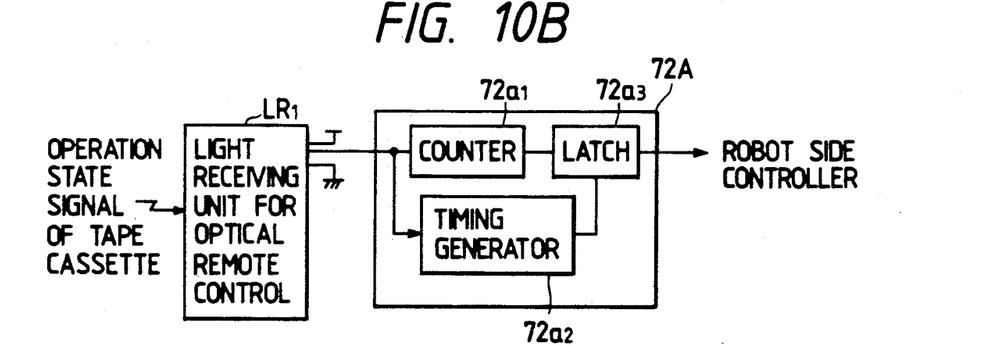

FIGS. 10A and 10B respectively show a signal conversion circuit 62A of the cassette for converting bit signals A, B, . . . into light pulses, and a signal conversion circuit 72A of the robot.

The structures and functions of said signal conversion circuits will be explained in the following.

At first, in response to the counting of the tape cassette $50A_1$ on the cassette holder 22, the switch SW1 is closed to activate the initial state control signal generating circuit 60, of which signal is supplied to the bit signal forming circuit 62. Thus a bit signal B, indicating the initial state, is supplied from said circuit 62 to a signal processing circuit 82 shown in FIG. 10A.

As shown in FIG. 10A, the signal processing circuit 82 is composed of a converter 82A, an oscillator 82B, a frequency divider 82C, and an AND gate 82D.

Figure 10C:
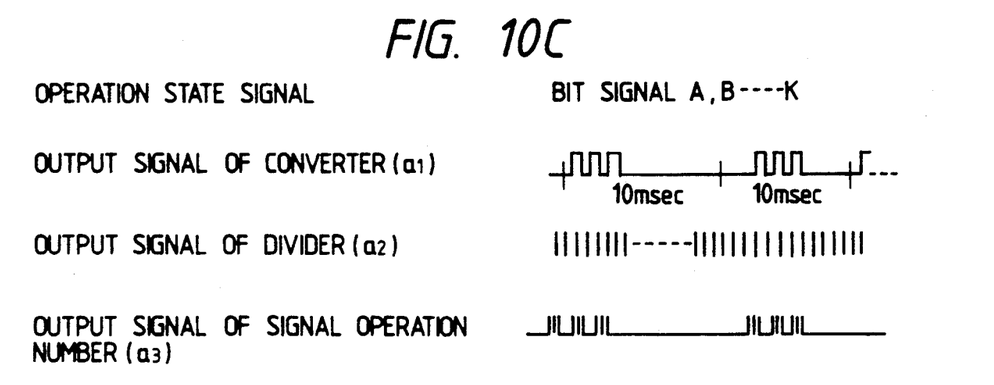

Said bit signal B is supplied to the converter 82A and converted into a pulse encoded signal $a_1$ shown in FIG. 10C.

The frequency divider 82C divides the frequency of pulses of 6 MHz from the oscillator 82B to generate a pulse signal $a_2$ of 48 kHz shown in FIG. 10C.

The outputs of said converter 82A and frequency divider 82C are supplied to the AND gate 82D to obtain a pulse signal $a_3$ shown in FIG. 10C, which is supplied to the light emitting circuit LEC of the optical communication means $L_1$, whereby a light signal is sent from the tape cassette to the photosensor $LR_1$ of the robot.

When the tape cassette $50A_1$ is in the initial state mode, and the robot is in access to said tape cassette $50A_1$, the light-emitting means thereof constantly sends said signal.

The controller of the robot receives the signal $a_3$ representing the function state of said tape cassette $50A_1$ by the photosensor $LR_1$ constituting the optical communication means $L_1$, and enters said signal into the signal processing circuit 72A of the robot shown in FIG. 10B.

Said signal processing circuit 72A is composed of $72a_1$, a timing signal generator $72a_2$, and a latch circuit $72a_3$.

Upon receiving the light signal $a_3$ by the photosensor $LR_1$, the signal processing circuit 72A counts the number of pulses entered into the counter within an interval of 10 msec defined by the timing generator, and stores said number in the latch circuit $72a_3$.

After the robot reaches the access position to the tape cassette $50A_1$ but before the start of access operation, the robot read the signal from said latch circuit $72a_3$ and identifies the initial state mode of said tape cassette $50A_1$ from the signal B.

As explained in the foregoing, in a case where the number of articles to be consumed in the assembling-/working station is deficient, the supplement information obtained in said station is sent to the article supply (molding) station to achieve the supply of articles in consideration of such deficiency, so that the present invention can securely recover the deficiency of articles in the assembling/working station.

In order to solve the drawbacks explained above, the present invention effects optical communication between the robot and the tape cassette incorporating the tape carrying the articles, whereby each tape cassette emits a signal representing the function state thereof, and the robot recognizes said function state upon arriving at the access position to the tape cassette. By such optical communication between the tape cassette and the robot, the present invention avoids the cable connection between the controllers of said tape cassette and the robot and the complications associated with such cable connection.

Also, in the present invention, the function state of the tape cassette is sent by a bit signal to the robot, whereby, even in an article supply system including plural tape cassettes arranged along the running path of the robot, the robot controls its operation by recognizing the state of the tape cassette by receiving the light signal. Thus the communication can be exactly conducted even in the presence of plural tape cassettes, and the communication control system is not complicated even when the number of tape cassettes increases.

We claim:

1. An apparatus for transporting articles by a transporting member, comprising:
    a transporting member having plural recesses in succession for storing and transporting the articles;
    a cover tape for covering apertures of said recesses of said transporting member;
    a first reel on which a first end of said transporting member and a first end of said cover tape are fixed, for simultaneously winding said transporting member and said cover tape;
    a second reel on which a second end of said transporting member is fixed, for winding said transporting member only;
    a third reel on which a second end of said cover tape is fixed, for winding said cover tape only;
    drive means for rotating said first, second and third reels;
    intermittent drive means for intermittently driving said transporting member, by engaging consecutive perforations formed in said transporting member;
    control means for driving said drive means and said intermittent drive means;
    an aperture for loading or removing said articles into or from said recesses of said transporting member; and
    first article detection means provided in the vicinity of said aperture for detecting the presence or absence of the article in said recess;
    and said apparatus further comprising an article manufacturing apparatus and an article assembling apparatus, each including a main control unit and a robot hand connected to said control means, wherein said drive means and said article assembling apparatus or said article manufacturing apparatus are synchronized according to the result of detection by said first detection means.

2. An apparatus according to claim 1, further comprising second detection means in the vicinity of said first detection means and at an article supply side thereof, for detecting the presence or absence of the article prior to the detection by said first detection means, wherein loading of the articles is conducted by cooperation of said apparatus for transporting and said article assembling apparatus according to the result of detection by said second detection means.

3. An article transporting apparatus comprising:
    a carrier tape having plural recesses in succession for storing and transporting articles;
    a cover tape for covering apertures of said recesses of said carrier tape;
    a first reel on which a first end of said carrier tape and a first end of said cover tape are fixed, for simultaneously winding said carrier tape and said cover tape;
    a second reel on which a second end of said carrier tape is fixed, for winding said carrier tape only;
    a third reel on which a second end of said cover tape is fixed, for winding said cover tape only;
    a drive assembly for driving said first, second and third reels;
    intermittent drive means for intermittently driving said carrier tape by engaging successive perforations formed in said carrier tape;
    control means for controlling said drive assembly and said intermittent drive means;
    an aperture for loading or removing the article into or from said recess of said carrier tape;
    detection means provided in the vicinity of said aperture for detecting the presence or absence of the article in said recess;
    guide means for defining position with respect to an article assembling apparatus or an article manufacturing apparatus; and
    communication connector means,
    wherein each of said article assembling apparatus and said article manufacturing apparatus is provided with a robot hand, a main control unit connected to said control means, and an information connector means, and, when said article transporting apparatus is coupled with said article assembling apparatus or said article manufacturing apparatus through said information connector means, the loading or assembling of articles, respectively, is conducted by cooperation of said article transporting apparatus and said article assembling apparatus or said article manufacturing apparatus according to the result of detection by said detection means.

* * * * *

UNITED STATES PATENT AND TRADEMARK OFFICE
CERTIFICATE OF CORRECTION

PATENT NO. : 5,090,113
DATED : February 25, 1992
INVENTOR(S) : SACHIO UMETSU ET AL.

It is certified that error appears in the above-identified patent and that said Letters Patent is hereby corrected as shown below:

ON THE TITLE PAGE:

AT [30] FOREIGN APPLICATION PRIORITY DATA

Insert, --Mar. 8, 1990 [JP] Japan.... 2-59692
               Mar. 8, 1990 [JP] Japan.... 2-59693
               Mar. 8, 1990 [JP] Japan.... 2-59694--.

COLUMN 2

Line 46, "by" (first occurrence) should read --of-- and "by" (second occurrence) should read --due to--.

COLUMN 3

Line 14, "wiring" should read --wiring,--.
    Line 17, "proposes," should read --proposes--.

COLUMN 5

Line 21, "end 13e" should read --end 13d--.

UNITED STATES PATENT AND TRADEMARK OFFICE
CERTIFICATE OF CORRECTION

PATENT NO. : 5,090,113

DATED : February 25, 1992

INVENTOR(S) : SACHIO UMETSU ET AL.

It is certified that error appears in the above-identified patent and that said Letters Patent is hereby corrected as shown below:

COLUMN 8

Line 34, "signal " "," should read --signal "0", --.

COLUMN 9

Line 56, "substraction," should read --subtraction--.

Signed and Sealed this

Tenth Day of August, 1993

Attest:

MICHAEL K. KIRK

*Attesting Officer*     Acting Commissioner of Patents and Trademarks